US007693659B2

(12) United States Patent
Zimmerman et al.

(10) Patent No.: US 7,693,659 B2
(45) Date of Patent: Apr. 6, 2010

(54) SATELLITE NAVIGATION SYSTEM USING MULTIPLE ANTENNAS

(75) Inventors: Kurt R. Zimmerman, Mountain View, CA (US); Dave Lawrence, Mountain View, CA (US); Michael L. O'Connor, Redwood City, CA (US); Paul Montgomery, Menlo Park, CA (US)

(73) Assignee: Novariant, Inc., Fremont, CA (US)

( * ) Notice: Subject to any disclaimer, the term of this patent is extended or adjusted under 35 U.S.C. 154(b) by 699 days.

(21) Appl. No.: 11/190,640

(22) Filed: Jul. 27, 2005

(65) Prior Publication Data

US 2005/0278119 A1     Dec. 15, 2005

Related U.S. Application Data

(62) Division of application No. 10/408,496, filed on Apr. 7, 2003, now Pat. No. 7,027,918.

(51) Int. Cl.
*G01C 21/00* (2006.01)

(52) U.S. Cl. .................. 701/215; 701/207; 701/213; 701/214; 342/352; 342/357.01; 342/357.02; 342/357.04; 342/357.06; 342/357.11; 342/357.12; 342/357.15; 342/357.17; 340/988

(58) Field of Classification Search ............ 701/207, 701/213, 214, 215; 342/357.01, 357.02, 342/357.04, 357.06, 357.11, 357.12, 357.15, 342/357.17, 358; 340/988
See application file for complete search history.

(56) References Cited

U.S. PATENT DOCUMENTS

| 4,797,677 | A | * | 1/1989 | MacDoran et al. | .......... 342/352 |
| 4,870,422 | A | * | 9/1989 | Counselman, III | ..... 342/357.12 |
| 5,021,792 | A | * | 6/1991 | Hwang | .................. 342/357.11 |
| 5,323,322 | A | * | 6/1994 | Mueller et al. | ............... 701/215 |
| 5,359,332 | A | * | 10/1994 | Allison et al. | .......... 342/357.04 |
| 5,534,875 | A | * | 7/1996 | Diefes et al. | ........... 342/357.11 |
| 5,548,293 | A | * | 8/1996 | Cohen | ................... 342/357.11 |
| 5,583,513 | A | * | 12/1996 | Cohen | ................... 342/357.06 |

(Continued)

OTHER PUBLICATIONS

Differential GPS in Global Positioning System: Theory and Applications II; vol. 164 of Progress in Aeronautics and Astronautics; pp. 3-50; by Parkinson, B. W. et al. Editors; AIAA, 1996.

(Continued)

*Primary Examiner*—Khoi Tran
*Assistant Examiner*—Jorge O Peche
(74) *Attorney, Agent, or Firm*—Brinks, Hofer, Gilson & Lione

(57) ABSTRACT

A satellite navigation system using multiple antennas for providing the position of multiple fiduciary points on an object even when fewer than four satellites are visible to some or all the antennas. Satellite signals from the multiple antennas are fed into at least one receiver. The receiver or receivers utilize constraint information, which is independent of the satellite signals. These external constraints are used to augment the signals received from the satellites, to obtain the position solution for each antenna. In a preferred embodiment, a common reference clock is used to provide an external constraint. Examples of other external constraints that can be used in the current invention are distance between the antennas, inertial measurement of attitude, rotational or linear position sensors, etc.

8 Claims, 7 Drawing Sheets

U.S. PATENT DOCUMENTS

| | | | | |
|---|---|---|---|---|
| 5,935,194 | A | * | 8/1999 | Talbot et al. ................. 701/214 |
| 5,977,909 | A | * | 11/1999 | Harrison et al. ......... 342/357.09 |
| 6,005,514 | A | * | 12/1999 | Lightsey ..................... 342/365 |
| 6,259,398 | B1 | * | 7/2001 | Riley ...................... 342/357.04 |
| 6,292,132 | B1 | * | 9/2001 | Wilson .................. 342/357.02 |
| 6,353,412 | B1 | * | 3/2002 | Soliman ..................... 342/387 |
| 6,373,432 | B1 | * | 4/2002 | Rabinowitz et al. .... 342/357.16 |
| 6,421,003 | B1 | * | 7/2002 | Riley et al. ............ 342/357.11 |
| 6,441,779 | B1 | * | 8/2002 | Bennett et al. ......... 342/357.11 |
| 6,594,582 | B1 | * | 7/2003 | Quinn ........................ 701/213 |
| 6,762,714 | B2 | * | 7/2004 | Cohen et al. ........... 342/357.12 |
| 6,782,320 | B1 | * | 8/2004 | Bahder ....................... 701/213 |
| 7,339,525 | B2 | * | 3/2008 | Zimmerman et al. ........ 342/464 |
| 7,450,063 | B2 | * | 11/2008 | Kangas .................. 342/357.12 |
| 2002/0161522 | A1 | * | 10/2002 | Cohen et al. ................ 701/213 |
| 2002/0165669 | A1 | * | 11/2002 | Pinto et al. .................. 701/213 |
| 2003/0085839 | A1 | * | 5/2003 | Zhodzishky et al. ... 342/357.12 |
| 2003/0201933 | A1 | * | 10/2003 | Cohen et al. ........... 342/357.12 |

OTHER PUBLICATIONS

"Navigation Integrity for Aircraft Precision Landing Using the Global Positioning System," Stanford University; pp. 37-66 and 150-151; by Pervan, Boris S., PhD., Dissertation, 1996.

"Instantaneous Ambiguity Resolution," by Ron Hatch; Magnavox Advanced Products and Systems Company, Torrance, CA 90503; KIS Symposium 1990, Banff, Canada, Sep. 1990; pp. 299-308.

"A New Method of Instantaneous Ambiguity Resolution," by Don Knight, Proceedings of ION GPS-94, Salt Lake City, UT; Institute of Navigation, Washington, D.C.; Sep. 20-24, 1994; pp. 707-716.

"Maintaining GPS Positioning in Steep Turns Using Two Antennae," by Lawrence, David G. et al.; Presented at the Institute of Navigation (ION) GPS-95; Palm Springs, CA; Sep. 1995; 9 pgs.

* cited by examiner

SATELLITE NAVIGATION SYSTEM USING MULTIPLE ANTENNAS

CROSS-REFERENCE TO RELATED APPLICATIONS

This application is a divisional of U.S. application Ser. No. 10/408,496, filed Apr. 7, 2003, now U.S. Pat. No. 7,027,918, the entire disclosure of which is incorporated herein by reference.

BACKGROUND

The present invention relates generally to satellite navigation systems. In particular, the invention relates to a method and system for using multiple antennas to obtain position solution for each antenna in a satellite navigation system where signals from fewer than four satellites are available at some antennas.

Global Positioning System or GPS is extensively used for position determination. It is a network of satellites that continuously transmit coded information that are utilized to precisely determine locations on the Earth.

GPS can be divided into three segments viz., a space segment, a control segment and a user segment. The space segment nominally consists of a network of 24 satellites distributed in 6 orbit planes around the Earth. The orbits are so distributed that at any instant of time a receiver positioned anywhere on Earth can receive signals from at least four satellites. The satellites continuously broadcast low power radio signals that travel in the "line of sight", i.e. the signals cannot travel through opaque objects. GPS signals comprise i) a signal carrier wave, ii) a pseudo random noise code (PRN), and iii) ephemeris and almanac data. The PRN code is unique to each satellite. It is used to calculate the distance between a receiver and the satellites. Ephemeris data contains correction factors that are used by the receiver to interpret GPS signals more accurately. Almanac data contains information about the exact location of the satellites and is necessary to determine the location of the receiver. The control segment comprises 5 control stations. This system controls GPS satellites by tracking them and thereafter providing them with corrected orbital and clock information.

At the user end, a typical receiver receives signals and calculates the distance from a satellite. This is done by measuring the difference between the time of receiving a signal at the user's end and the time of broadcast of the signal from the satellite. The time difference is calculated by measuring the PRN code phase difference between the received signal and an identical signal that was simultaneously generated at the receiver end. For conventional GPS code-phase positioning, a user receiver requires simultaneous measurements of code phase from a minimum of four different satellites to solve for its four unknown space-time coordinates, i.e. three position coordinates and internal clock offset from GPS time. This is a basic form of GPS positioning and provides a navigation solution that is typically accurate to 10 m in a world coordinate frame.

The conventional GPS technique described above suffers from a number of errors from different sources. Apart from receiver clock errors and orbital errors, there are ionosphere and troposphere delays where the satellite signal slows as it passes through the atmosphere. This error is greatly reduced in a method known as Differential GPS (DGPS). DGPS employs a fixed reference station in the above-discussed GPS. This reference station measures its position using GPS. The reference station broadcasts differential correction information over a communication link to all mobile receivers in the vicinity, so that the mobile receivers establish a very accurate position relative to the reference station. The information broadcast by the reference station may be its own raw code phase measurements or a correction factor based on the difference between its current position measurement and a long-term average position. With the use of DGPS, accuracy of around 1-5 meters can be achieved.

The following explanation describes how a conventional GPS (and DGPS) position solution is derived from phase measurements.

Conventional GPS Position Solution

The conventional GPS technique calculates user position and other parameters from pseudorange measurements made by a receiver. This method provides a position solution in a world reference frame with an accuracy of around 10 meters. For differential GPS, the differential code phase measurements represent differences between code phase measurements made simultaneously by a mobile user receiver and a fixed reference station. The differential GPS position solution is in a frame relative to the reference station and the solution is accurate to a few meters.

The pseudorange observation between satellite i and user antenna j is related to the user position and clock bias by the equation:

$$\rho_{ij} = |r_j - x_i| + \tau_i \quad \text{Equation 1}$$

Where $\rho_{ij}$ is the measured pseudorange, $r_i$ is the satellite position, $x_i$ is the receiver position, $|r_i - x_i|$ is the true range, and $\tau_i$ is the receiver clock bias times the speed of light. Various error sources, including antenna line bias etc, that are not essential to the current discussion have been ignored. In differential GPS, $\rho_{ij}$ is the code-phase difference between the reference antenna and user antenna, and $r_j$ is the reference antenna position. To solve for the user position from the pseudorange, Equation 1 may be linearized (as in Equation 2 below) about an apriori estimate of position, $\hat{x}_i$, where $\Delta x_i = \hat{x}_i - x_i$ and $\Delta \rho_{ij}$ is the difference between the predicted measurement, based on $\hat{x}_i$, and the actual measurement.

$$\Delta \rho_i = [E_i \quad 1] \begin{bmatrix} \Delta x_i \\ \tau'_i \end{bmatrix} \quad \text{Equation 2}$$

Where $$\Delta \rho_i \equiv \begin{bmatrix} \Delta \rho_{i1} \\ \vdots \\ \Delta \rho_{in_s} \end{bmatrix} \quad \text{Equation 3}$$

$$E_i \equiv \begin{bmatrix} -\hat{e}_{i1}^T \\ \vdots \\ -\hat{e}_{in_s}^T \end{bmatrix} \quad \text{Equation 4}$$

$$\hat{e}_{i1} \equiv \frac{r_j - \hat{x}_i}{|r_j - \hat{x}_i|} \quad \text{Equation 5}$$

A set of four or more measurements in equation 2 can be combined into a set of normal equations that can be solved for user position $x_i$. The observation matrix $[E_i \ 1]$ is usually referred to as the geometry matrix and $\hat{e}_{ij}$ are line-of-sight vectors from antenna i to satellite j. The symbol "1" is shorthand for a column vector of 1's of appropriate dimension.

An application requiring two or more position measurements might simply employ independent GPS receivers for each position measurement, even though there may be constraint relations between the antennas.

In such an instance, each receiver would form its own independent solution based on Equation 2. If the phase information from all such receivers were combined at a central processor, Equation 2 could be extended as Equation 6 and then solved.

$$\begin{bmatrix} \Delta\rho_1 \\ \Delta\rho_2 \\ \vdots \\ \Delta\rho_{n_a} \end{bmatrix} = \begin{bmatrix} [E_1 \ 1] & 0 & \cdots & 0 \\ 0 & [E_2 \ 1] & & \vdots \\ \vdots & & \ddots & 0 \\ 0 & \cdots & 0 & [E_{n_a} \ 1] \end{bmatrix} \begin{bmatrix} \Delta x_1 \\ \tau_1 \\ \Delta x_2 \\ \tau_2 \\ \vdots \\ \Delta x_{n_a} \\ \tau_{n_a} \end{bmatrix} \quad \text{Equation 6}$$

For applications requiring the highest possible accuracy, a method called carrier-phase differential GPS, or more commonly, real time kinematic (RTK), can be used. In this method, the GPS carrier wave is measured directly and compared to a similar carrier wave (phase) measurement made by the reference station. Using carrier phase differential GPS, accuracies of 1-2 centimeters relative to the reference station can be achieved.

The following explanation describes how GPS carrier phase techniques are used to derive the position solution.

GPS Carrier Phase Techniques

GPS carrier phase techniques employ carrier phase measurements to determine centimeter-level accurate position solutions. A fundamental requirement of all carrier phase techniques is to solve for carrier cycle ambiguities.

At any given sample instant there are more unknowns for which to solve than there are available measurements. Therefore, measurements must (1) be accumulated over multiple sample instances, (2) be taken over the course of some geometric change in the system—by the satellites, user, or both, and (3) contain more than four (at least five) measurements per sample to provide redundancy for obtaining the position solution. Some of the techniques of carrier phase measurement are: 1) Satellite motion [as described in Differential GPS in Global Positioning System: Theory and Applications II, volume 164 of Progress in Aeronautics and Astronautics, pp. 3-50, by Parkinson, B. W. and Spilker, J. J. Jr., Editors. AIAA, 1996.], 2) User motion [as described in "Navigation Integrity for Aircraft Precision Landing Using the Global Positioning System", Stanford University, pp. 37-66, pp. 150-151, by Pervan, Boris S., Ph.D. Dissertation, 1996.], 3) Integer searching [As described in "Instantaneous Ambiguity Resolution," KIS Symposium 1990, Banff, Canada, September 1990, by Hatch, R. and in "A New Method of Instantaneous Ambiguity Resolution," Proceedings of ION GPS-94, Salt Lake City, Utah, Institute of Navigation, Washington, D.C., Sep. 20-24, 1994. by Knight, D.]

In a manner similar to the code phase solution shown above, the relationship between carrier phase measurements and the unknown user position and clock state is provided here as a basis to show how a solution incorporating constraints would differ from conventional carrier phase method. The differential carrier phase measurement between the user and a reference receiver for antenna i and satellite j is related to the position, cycle ambiguity, and clock bias by the following equation:

$$\phi_{ij} = |r_j - x_i| + \tau_i + N_{ij} \quad \text{Equation 7}$$

Where $\phi_{ij}$ is the measured differential carrier phase, $r_j$, $x_i$, and $\tau_i$ are as above, and $N_{ij}$ is the cycle ambiguity, in carrier wavelengths. Again, several error sources not essential to the current discussion are ignored here. The various satellite- or user-motion based methods for converting carrier phase information to user state begin with the formulation of a linearized observation matrix relating the differential carrier phase measurements to the unknown position, clock, and cycle ambiguity states. As was done with equation (1) in the code phase solution, equation (7) may be linearized about an a priori estimate of position, $\hat{x}_i$, where $\Delta x_i = \hat{x}_i - x_i$ and $\phi_{ij}$ is the difference between the predicted measurement, based on $\hat{x}_i$, and the actual measurement.

$$\Delta\phi_i = [E_i \ 1 \ \bar{I}] \begin{bmatrix} \Delta x_i \\ \tau'_i \\ \Delta N_{i2} \\ \vdots \\ \Delta N_{in_s} \end{bmatrix} \quad \text{Equation 8}$$

Where $$\Delta\phi_i \equiv \begin{bmatrix} \Delta\phi_{i1} \\ \vdots \\ \Delta\phi_{in_s} \end{bmatrix} \quad \text{Equation 9}$$

$$\bar{I} \equiv \begin{bmatrix} 0 \\ I \end{bmatrix} \quad \text{Equation 10}$$

$$\tau'_i \equiv \tau_i + N_{i1} \quad \text{Equation 11}$$

$$\Delta N_{ij} \equiv N_{ij} - N_{i1} \quad \text{Equation 12}$$

The substitutions of $\tau_i'$ for $\tau_i$ and integer differences $\Delta N_{ij}$ for $N_{ij}$ are made because the integers themselves, solved in this manner, are not distinguishable from clock bias, but the integer differences are distinguishable.

Under normal circumstances, the observation matrix $[E_i \ 1 \ 1]$ does not contain enough information in one measurement update to allow the pseudo-inversion needed to generate the least-squares solution to the system of equations. However, taking many measurements through the course of motion of satellites, the motion of the user, or both, can provide measurement equations that accrue faster in number than the number of new user states, thereby creating a solvable system of equations. In practice, the amount of accumulated data is typically too large to solve in one huge concatenated-matrix inversion, but are instead solved by means of a forward-backward information filter [As described in "Navigation Integrity for Aircraft Precision Landing Using the Global Positioning System", Stanford University, pp. 37-66, pp. 150-151, 1996 by Pervan, Boris S., Ph.D. Dissertation].

The independent receiver approach can be represented by building a large observation matrix with independent observation matrices for each antenna along the diagonal. The user states for each antenna are likewise stacked into one large vector, as are the corresponding differential phase measurements $\phi_{ij}$. In this manner, by stacking Equation 8 from each differential phase measurement the following equation is obtained:

$$\begin{bmatrix} \Delta\phi_1 \\ \Delta\phi_2 \\ \vdots \\ \Delta\phi_{n_a} \end{bmatrix} = \quad \text{Equation 13}$$

-continued $$\begin{bmatrix} [E_1 & 1 & \bar{1}] & 0 & \cdots & 0 \\ 0 & [E_2 & 1 & \bar{1}] & & \vdots \\ \vdots & & \ddots & 0 \\ 0 & \cdots & 0 & [E_{n_a} & 1 & \bar{1}] \end{bmatrix} \begin{bmatrix} \Delta x_1 \\ \tau'_1 \\ \Delta N_{12} \\ \vdots \\ \Delta N_{1n_s} \\ \Delta x_2 \\ \tau'_2 \\ \Delta N_{22} \\ \vdots \\ \Delta N_{2n_s} \\ \vdots \\ \Delta x_{n_a} \\ \tau'_{n_a} \\ \Delta N_{n_a 2} \\ \vdots \\ \Delta N_{n_a n_s} \end{bmatrix}$$

However, establishing proper carrier phase measurements requires one of several initialization processes to be performed. The type of process performed depends on the geometric layout of the overall system and motion on the part of either the satellites or the mobile receiver. The initialization process is known as carrier cycle ambiguity resolution or integer resolution. This process typically requires the user to wait for at least a few minutes during which the satellite signal is re-acquired unto its high accuracy mode. The initialization process must be carried out every time a user receiver loses continuous track of a minimum of four satellites.

A frequent limitation in the use of any of the above GPS methods for determining position is the requirement of continuous visibility of four satellites to the GPS antenna. However, the continuous visibility of four satellites is not practical in many real life situations. As the GPS signals travel in the "line of sight", buildings, terrain, electronic interference, or sometimes even dense foliage can block signal reception, causing limited satellite visibility. For example, when the system is being used to track locations in urban-areas, which are surrounded by skyscrapers visibility to four satellites is hindered. If there are fewer than four satellite signals available, a GPS receiver will lose its positioning ability and will require time to (1) re-acquire a sufficient number of satellite signals and (2) re-initialize to a high accuracy mode.

As a consequence of the line-of-sight visibility requirement, most GPS applications use a tall mast or similar mounting structure to raise the GPS antenna as high as possible. When applied to certain agricultural and construction equipment, large antenna mounting structures may limit the mobility of the implement. Also, large antenna mounts only partially address the problem and often even large antenna mounts are not useful in case of signal blockage.

There are certain GPS based navigation systems that work even with visibility to fewer than four satellites.

One such system is disclosed in "Maintaining GPS Positioning in Steep Turns Using Two Antennae," Institute of Navigation GPS-95, Palm Springs, Calif., September 1995, by Lawrence, David G., et al. This system uses two antennas, mounted on an airplane, to maintain continuous position tracking even when fewer than four satellites are visible on one of the antennas.

However, this system cannot be generalized to more than two antennas and does not allow for motion and/or clock divergence among a subset of the antennas. This system requires a separate set of four antennas to provide attitude information, which in turn is used to determine the position.

Another such system is disclosed in U.S. Pat. No. 5,977, 909, titled "Method And Apparatus For Locating An Object Using Reduced Number Of GPS Satellite Signals Or With Improved Accuracy" and assigned to General Electric Company (Schenectady, N.Y.). This patent discloses a positioning system that involves the use of position constraint to reduce the number of satellite signals required per antenna to determine the position of an object. In this patent, the physical track of a rail car is used to constrain the location of the rail car. Therefore, the number of GPS signals required for determining the position is reduced. This invention can track objects, which follow a specific path, so that a database can be generated. This database is used to provide additional information while determining the position of the object. Unfortunately, the scope of such a system is very limited. This system cannot be used to determine the position in unfamiliar locations, where the path traversed by the object is not known. For example, this invention would not be suitable for positioning farm equipment or automobiles, since the creation of a database in these cases would be almost impossible.

Another system that can determine position using fewer than four GPS satellites is disclosed in U.S. Pat. No. 6,353, 412 titled "Method And Apparatus For Determining Position Location Using Reduced Number Of GPS Satellites And Synchronized And Unsynchronized Base Stations", and assigned to Qualcomm, Incorporated (San Diego, Calif.). This patent discloses a location determining GPS system for wireless receivers. The wireless communication device is adapted to receive these GPS signals and transmit a fourth signal to a base station in response thereto. The base station receives the fourth signal, corrects for the clock bias imposed on the fourth signal by the round trip delay between the base station and the wireless communication device, and uses the unbiased fourth signal to calculate the position of the wireless communication device.

However, this method requires a wireless device so as to communicate with a cellular base station in order to provide satellite almanacs and remove clock-bias. Hence, this system will not work in places where there are no base stations in the vicinity or the base station is not capable of providing the correction factors. This situation could arise in cases when the user is in some isolated or uninhabited locations, and many farms are in fact located in isolated or uninhabited areas.

Another satellite navigation system utilizing fewer than four antennas has been disclosed in U.S. Pat. No. 6,292,132 titled "System And Method For Improved Accuracy In Locating And Maintaining Positions Using GPS", and assigned to Daimler Chrysler AG (Stuttgart, Del.). This system uses multiple GPS antennas and corresponding processors on a single vehicle in order to maintain position information when fewer than four GPS satellites are visible. This system calculates differential path lengths between the received position information signals and at least two antenna-processor pairs to determine the cone angles between them. The corresponding position information of the mobile vehicle is maintained using the initial position information and the determined cone angles. However, this system requires prior knowledge of the initial position. Moreover, this system is not very accurate as it is based on extrapolating the position based on the initial position and the information generated by the sensors attached to the steering wheel.

Another method for obtaining location solutions even in the absence of four GPS signals is disclosed in U.S. Pat. No. 5,935,194 titled "Method For Using External Constraints To Improve The Speed And Reliability Of Phase Ambiguity Resolution In Real-Time Kinematic Initialization", and assigned to Trimble Navigation Limited (Sunnyvale, Calif.). This invention uses externally provided constraints, such as altitude to reduce the computational burden in determining the position. This invention works particularly in the case when there are a limited number of satellites visible to the receiver.

However, this system utilizes various constraints only to simplify the computational burden and in resolving integer cycle ambiguities. It does not use constraints to specifically circumvent the need for the fourth satellite, nor does it use the constraints to improve or enable centimeter-level positioning once the cycle ambiguities have been resolved. This system simply focuses on using constraints to better traverse the search tree involved in resolving the integer ambiguity cycle. Furthermore, this system only relates to search-type methods for resolving integer cycle ambiguities and, therefore, it relies on dual frequency measurements to reduce the search space to a manageable size (and as such does not benefit motion-based methods).

U.S. Pat. No. 5,548,293, titled "System And Method For Generating Attitude Determinations Using GPS" and assigned to Cohen describes a system for determining the attitude of a four-antenna configuration on a vehicle. The system uses physical constraints and motion-based methods for determining integer cycle ambiguities. The system also can measure wing flexure if the vehicle is an airplane and two of the four antennas are mounted on the wings. However, this system only describes configurations with four or more antennas and four or more satellites. It relates only to attitude determination of a single body. It does not provide a method for vehicles with multiple bodies connected by a linkage, such as a vehicle and an implement.

Therefore, there is a need for a system that can provide position and location information in a satellite navigation system, even when there are less than four satellite signals. In particular, there is a need for an invention that can provide the position of vehicles, which have multiple bodies connected by linkages, such as earth moving machines (that are working in remote or uninhabited areas and that do not have any constraints with respect to their initial or transient locations), even when antennas on some of the linkages cannot receive satellite signals. Further, there is a need for a method that obviates the need for cumbersome antenna mounting structures to receive signals from GPS satellites.

SUMMARY

An object of the present invention is to provide a satellite navigation system for determining the position solution for a plurality of antennas mounted on an object, when as few as two satellites are available to some antennas, and the object is located in an uninhabited or remote area and has only very general constraints with respect to its initial and transient locations.

Another object of the present invention is to use satellite-tracking information from one antenna to aid (or help bootstrap) tracking on another antenna.

Yet another object of the present invention is to obtain faster initialization and improved integer cycle hand-offs from one antenna to another for instantaneous integer-ambiguity initialization.

Yet another object of the present invention is to obviate the need for tall, cumbersome masts to elevate antennas used in construction equipments, agricultural equipments etc.

An embodiment of the present invention uses a common reference clock for the plurality of antennas, thereby requiring only the common reference clock to be initialized. The use of a common reference clock provides the constraint information.

In yet another embodiment of the present invention, a common reference clock is used for the antennas along with other kinematical constraints, such as distance between the antennas. In this case, the position solution for the antennas can be obtained even in the case when certain antennas have visibility to only two satellites.

In an alternative embodiment of the present invention, kinematical constraints, such as the distance between two antennas, are used to compute the position of antennas, when fewer than four satellite signals are available at some antennas. Instead of kinematical constraints, other constraints that arise among fixed antennas connected to a rigid body can also be used; such constraints include a measured offset between antennas (such as antennas mounted on opposing ends of a movable mechanical linkage, where the linkage is sensed with joint angle or displacement sensors) and a measured attitude or partial attitude of the object (such as with an inertial measurement unit, a compass, or a clinometer). Finally, external constraints (such as the location of a given tree or a large rock) can also be used to determine the position of antennas when fewer than four satellite signals are available.

The present invention utilizes external constraints to reduce the number of satellite signals required to determine the position of fiduciary points (corresponding to different antennas) on an object being tracked. The satellite signals are received at multiple antennas and these signals in conjunction with the constraint information are processed to get the position solutions. The constraints make the x, y, z and t coordinates of the fiduciary point on the object, interdependent and thus reduce the number of simultaneous equations required to determine the multiple position solutions. This, in turn, reduces the number of satellite signals required.

The invention utilizes the known position information to initialize the system to pick up un-tracked satellites. This ensures instant locking to a satellite as soon as it is visible and is achieved by calculating the integer cycle for a satellite-antenna combination using the known locations of the antenna as well as the satellite.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention provides for a method and system for determining fiduciary point position solutions of an object, using multiple antennas wherein each fiduciary point corresponds to an antenna placed on the object. The satellite signals from all antennas are used in conjunction with physical constraints to solve for the position solution for all the antennas mounted on the object. These physical constraints are independent of satellite signals and provide for obtaining the position solution even when fewer than four satellites are visible at some of the antennas.

In a preferred embodiment of the invention, satellite signals from the Global Positioning System (GPS) are used. The system nominally comprises a constellation of 24 satellites orbiting the earth in 6 different orbital planes such that from any point on Earth, at least four satellites are visible at any instant in time. In addition to this, GPS also has control stations to monitor and maintain the orbit and clock-time of all the satellites. GPS satellites continuously emit low power radio signals that are received by GPS receivers on earth. A typical GPS receiver comprises antennas for detecting the signals and a processor means for interpreting the signals. The receiver detects and decodes the GPS signals and returns the output to the user in a usable form. Although, the description mentions the use of GPS signals, it is apparent to one skilled in the art that the invention can make use of signals from other systems such as pseudolites, Low Earth Orbiting (LEO) satellites, geosynchronous satellites such as WAAS etc to determine the position solution.

Figure 1:
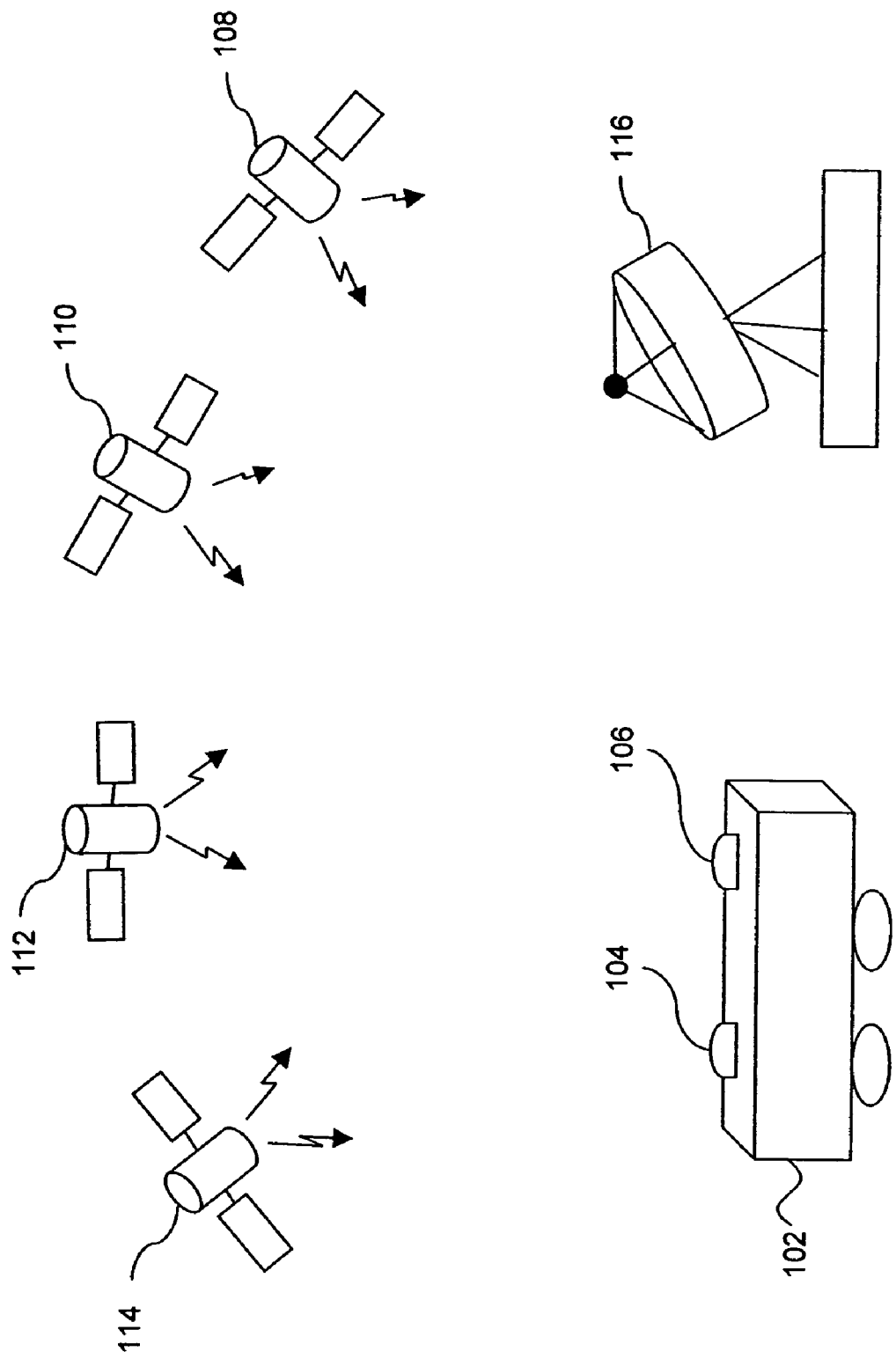
FIG. 1 is a schematic diagram of the general environment of the navigation system in accordance with a preferred embodiment of the present invention.

FIG. 1 is a schematic diagram of the general environment of the navigation system in accordance with a preferred embodiment of the present invention. Several antennas are mounted on an object 102 that is being tracked. Two such antennas, 104 and 106 are shown in FIG. 1. Object 102 can be any roving or stationary object whose position, and possibly attitude, needs to be determined. For example, it can be construction equipment such as cranes, agricultural equipment, automobiles, rail cars etc. A GPS receiver is attached to object 102. This receiver receives signals from satellites via antennas 104 and 106. Antennas 104 and 106 can be any standard antennas used in GPS receivers.

Antennas 104 and 106 receive navigation signals from satellites and feed them to a receiver. Four satellites 108, 110, 112 and 114 are shown in FIG. 1. Antenna 104 receives signals only from satellites 110, 112 and 114 and antenna 106 receives signals from satellites 108, 110 and 112. An antenna does not receive signals from a satellite when that satellite does not fall in the "line of sight" of the antenna. This can occur because of signal blockage. Blockage may result from self-occlusion, e.g., in case of an aircraft, the aircraft banking away from a satellite.

External constraints are used in conjunction with received satellite signals at antennas 104 and 106, to compute position solutions for the antennas.

External constraints can be known kinematical constraints between two antennas. For example, the distance between two antennas can be used as a constraint to solve for the position of each antenna. A common reference clock can also be used to provide the external constraint. Alternatively, in case of a multi-element object, the constraint can be obtained by measuring one or more degrees of freedom of the instantaneous configuration.

The system may also include a differential GPS (DGPS) reference station 116, in order to enhance the accuracy of the position solution. Use of a differential GPS reference station for both code and carrier phase positioning is well known in the art [As described in "Differential GPS, in Global Positioning System: Theory and Applications II, volume 164" of Progress in Aeronautics and Astronautics, pp. 3-50 by Parkinson, Bradford W. and Eng, Per K., Editors. AIAA, 1996]. Reference station 116 sends measurements of its own GPS position as well as code and carrier phases for each satellite in view via a data communication link to object 102. The code phase information may be C/A code only or both C/A and P-code. Likewise, the carrier phase information may be for GPS L1 frequency only, or both L1 and L2 frequencies. The GPS receiver of object 102 uses the information to calculate very high accuracy (cm-level) positions of the fiduciary points on object 102, with respect to reference station 116.

Figure 2:
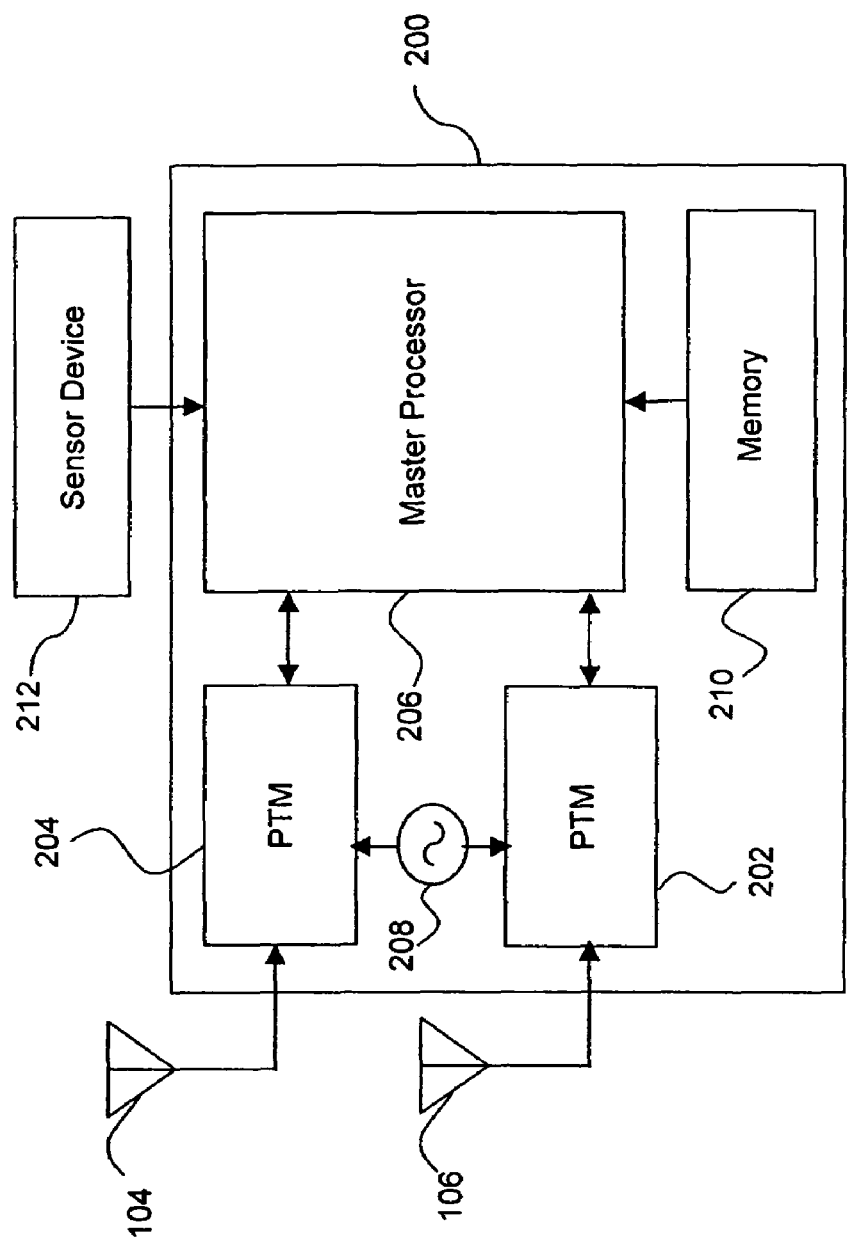
FIG. 2 is a block diagram of various components in the receiver.

FIG. 2 is a block diagram of the various components in the receiver 200 to which antennas 104 and 106 are connected. Although the invention is described for two antennas it is apparent to one skilled in the art that two antennas have been mentioned for exemplary purpose only and multiple antennas can be used without deviating from the scope of the invention. In a preferred embodiment of the present invention, a multi-antenna receiver may be used.

The antennas capture, filter, and amplify the incoming satellite signals into an electric signal that can be processed by receiver 200. Receiver 200 contains phase tracking modules (PTM) 202 and 204 (corresponding to antennas 104 and 106). PTMs 202 and 204 are in turn connected to master processor 206. PTMs 202 and 204 refer to a common reference clock 208.

Alternatively, PTMs 202 and 204 comprise an RF front-end that translates one of the carrier frequencies to a lower Intermediate Frequency (IF), a sampler (analog to digital converter) and a GPS correlator chip. The chipset may include a sampler function. An example of such a chipset is the Zarlink 2021 12-channel GPS correlator. Circuitry to translate from an input carrier frequency to an IF is well known in the art of RF design. Another embodiment of the present invention may use a Field-Programmable Gate Array (FPGA) or Application Specific Integrated Circuit (ASIC) instead of a commercial GPS correlator chipset to de-spread the signal. A variety of FPGA chips are available, for example FPGA chips from Xilinx and Altera.

In yet another embodiment of the present invention, PTMs 202 and 204 may comprise a conventional GPS receiver. In this case, either a processor on a designated master receiver or a separate external processor would serve the function of master processor 206. The common clock function can be achieved by simple modification to the receiver hardware, if such capability is not already built-in. Such receivers are widely available in the market from a variety of vendors. For example, BAE Systems' Allstar and Superstar GPS receivers can be used in the current invention.

Antennas 104 and 106 receive and amplify signals from GPS satellites and transfer it to their respective PTMs 202 and 204. Each PTM down-converts the signal from its associated antenna and may track code and carrier phases of all satellites visible to the antenna. PTMs 202 and 204 track satellite signals by generating an identical signal at the same instant at which the received signal is generated at the satellites. The received signal and the generated signal are compared to determine the phase difference between them. This is done for both code and carrier signals. The resultant code and carrier phase measurements are time-stamped and passed on to master processor 206.

Receiver 200 also contains a memory 210, which contains fixed constraint information. Constraint information may pertain to pre-surveyed data on the distance between antennas or any other known kinematical constraint. Receiver 200 is also connected to a sensor device 212 that provides variable constraint information to master processor 206. Sensor devices 212 can be rotary sensors that provide the angular motion between elements in a multi-element object wherein each element has an antenna attached to it. The sensor device can also be a device used for an inertial measurement of the attitude of an object. The sensor device can also be a device utilizing a gravitational, magnetic, optical, sonar, or capacitive measurement technique to measure some aspect of the relative locations of two or more antennas. Constraint information obtained from sensor devices 212 is sent directly to master processor 206 for inclusion in the position solution calculations.

Information from PTMs 202 and 204 is processed in conjunction with the constraint information at master processor 206 to solve for the position of each antenna. The constraint information is obtained by master processor 206 from memory 210 or from sensor devices 212. The constraint information is used to reduce the total number of raw phase measurements needed to solve any given transformation from phases to point positions. The reduced number of phase measurements can be applied to either code-phase or carrier-phase type solutions.

Figure 3:
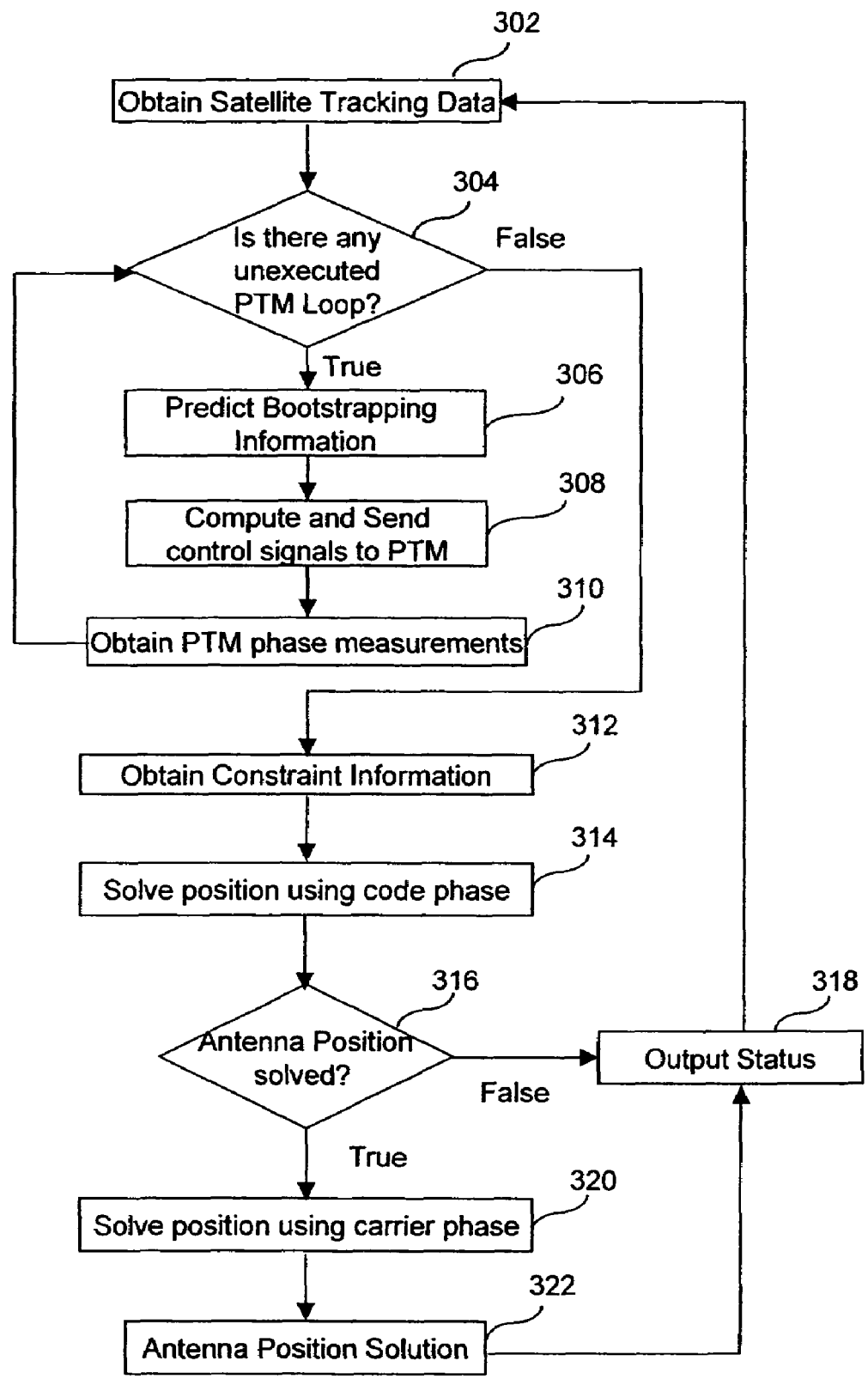
FIG. 3 is a flow chart depicting the steps performed by the master processor to determine the position of the fiduciary points on an object in accordance with a preferred embodiment of the present invention.

FIG. 3 is a flow chart depicting the steps carried out by master processor 206 in determining the antenna positions on an object in accordance with a preferred embodiment of the present invention. At step 302, master processor obtains satellite tracking data that contains information required for initialization. This may be based on stored data from a previous operation of the system. Step 302 includes the step of obtaining data from a reference receiver in case of Differential GPS. The reference data may include one or more of the following information: position of reference station 116, code and carrier phases, and phase rates for all satellites in view.

Each antenna on the object has an associated Phase Tracking Module (PTM), and each PTM can track a plurality of satellites. So for each PTM and each satellite tracked by the PTM, the master processor executes a set of steps to obtain PTM phase measurements for each satellite-antenna pair. At step 304, the master processor checks for any PTM for which phase measurements have not been obtained. At step 306, the master processor predicts expected bootstrapping details for each satellite in the tracking list of the antenna (PTM). The expected bootstrapping details may include the code and carrier phases and signal rates expecting to be observed at the antenna. These expected bootstrapping details help in computing aiding information required during the reacquiring and initialization process of a recently locked on satellite. The aiding information can be computed from any available differential GPS information, tracking information from other PTMs, or position estimates. In its simplest form, the aiding information may be the code phase or relative motion (Doppler) for a given satellite already tracked by the reference receiver or another PTM. In its most complete form, the aiding information may contain code and carrier phases and rates, as well as resolved carrier cycles.

At step 308, the master processor computes control data for each PTM and sends it to respective PTMs. Such control data may include which satellite PRN is to be tracked on a given channel, code and carrier phases, relative velocity, and accelerations of satellites with respect to the antenna, etc. The control data is then distributed to each PTM. At step 310, the master processor collects data from each PTM that includes the code and carrier phases of tracked satellites, their signal strengths, and other related data. At step 312, the master processor obtains all constraint information. The constraint information may be recalled from memory, such as for a fixed offset constraint. The constraint information can also be measured by a sensor and translated into a relationship between two or more antennas.

Once all available measurements and constraints are obtained, the master processor attempts to solve for antenna positions using the code phase or carrier phase technique. At step 314, the master processor solves for the code phase position for all antennas for which enough information exists. At step 316, the master processor checks whether a code phase solution has been obtained. If no code phase solution has been obtained, then the available data is made the output status information at step 318 and processing returns to step 302. The output status is the feedback information that is communicated to the master processor to aid computation.

However, if a code phase solution is obtained, then the master processor solves for a carrier phase solution at step 320. Unlike the code-phase solution, the carrier phase solution requires data over many sample periods to reach convergence, i.e., the observability of the integer cycles is accrued over many sample periods as motion occurs in the system. At step 322, after carrier phase processing is completed, the position solutions are output from the receiver. This output position solution adds on with the output status information regarding the accuracy of the solutions at step 318. The processing then returns to step 302.

Figure 4:
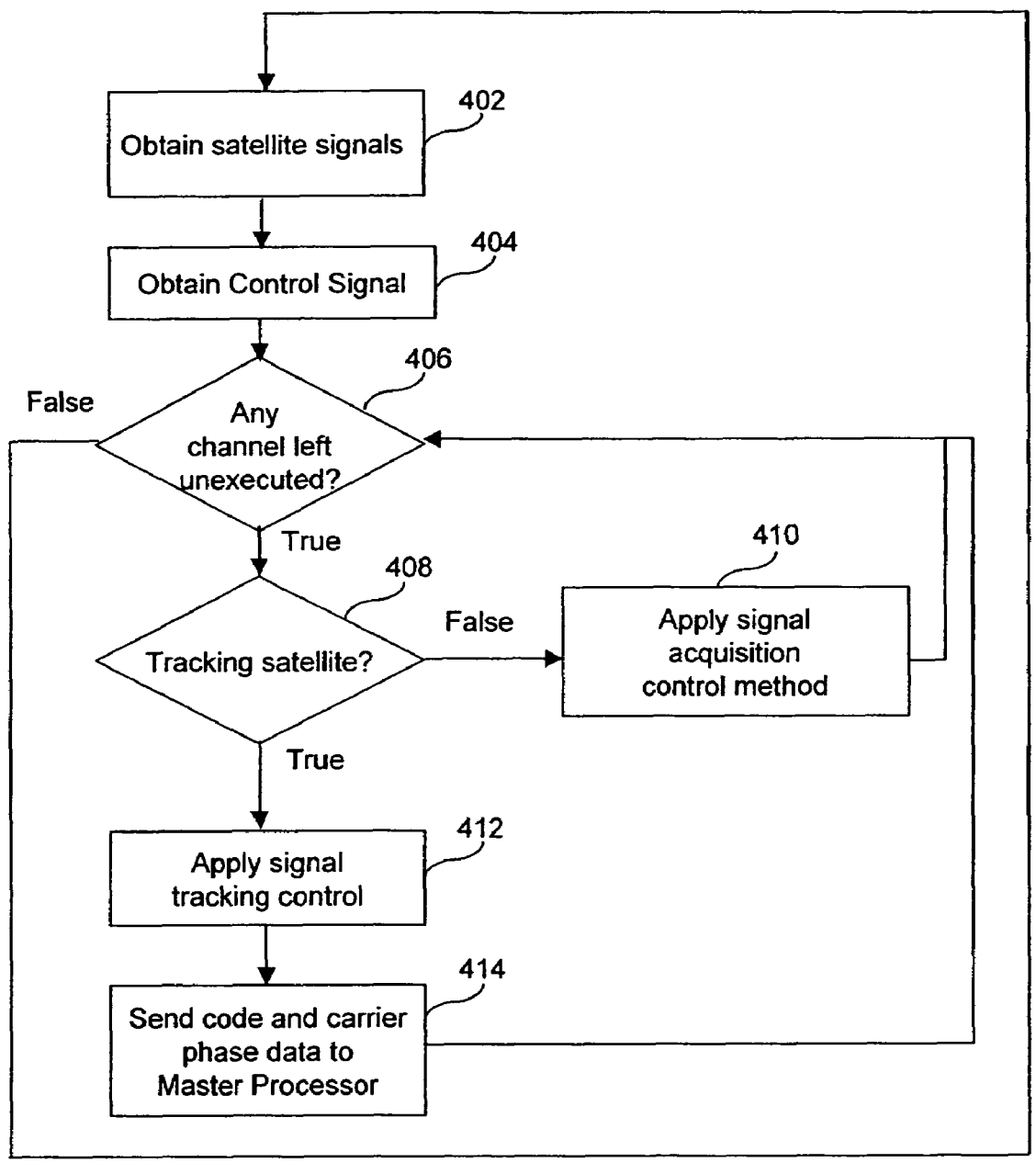
FIG. 4 is a flow chart depicting the steps performed by each phase tracking module to obtain the code and carrier phases and GPS data to send to the master processor.

FIG. 4 shows the steps followed by a Phase Tracking Module (PTM) in accordance with a preferred embodiment of the invention. Satellite signals are received at step 402 by means of an RF sampler, which samples the raw signal collected and amplified by the antenna and may contain GPS L1 and L2 components. The signals may be down-converted to intermediate frequency. In step 404, the PTM obtains control signal from master processor 206 that contains information such as which satellites to track, control data that are used to adjust PRN code correlators, and predicted code and carrier phases and rates to aid locking on to signals. The PTM consists of a plurality of channels, each of which can track a different satellite signal. At step 406, the PTM checks whether each of the plurality of channels are executed. At step 408, a check is carried out for the presence of any untracked satellite in the tracking list of the PTM. If the satellite signal is not yet in lock, the PTM applies a signal acquisition control method at step 410 [as described in Differential GPS in Global Positioning System: Theory and Applications I, volume 164 of Progress in Aeronautics and Astronautics, pp. 329-407, by Parkinson, B. W. and Spilker, J. J. Jr., Editors. AIAA, 1996.] This control method tries to acquire the L1 and/or L2 signals based on correlation with an internally generated version of the signal, as is known in the art. This method may be enhanced using predicted code and carrier phases and rates, when they are available from master processor 206. The ability to aid the initial lock-on to the satellite signals in this manner is a unique aspect of the invention, because the predicted phases and rates may be known very precisely due to the existing constraints. If the satellite signal is being tracked, then the PTM applies a signal tracking control method at step 412. This control method maintains code and carrier phase lock on the signal. If dual frequencies are employed, the PTM may use a tracked L1 signal to aid lock on to the L2 signal at this step. For either cases of a tracked satellite signal (step 410) or un-tracked satellite signal (step 412), the code phases for any given satellite may be summed together across multiple PTMs to increase the signal-to-noise ratio for that satellite. At step 414, the most recent measures of code and carrier phases and rates for all tracked satellites are sent to the master processor to allow for position solution calculation.

Figure 5:
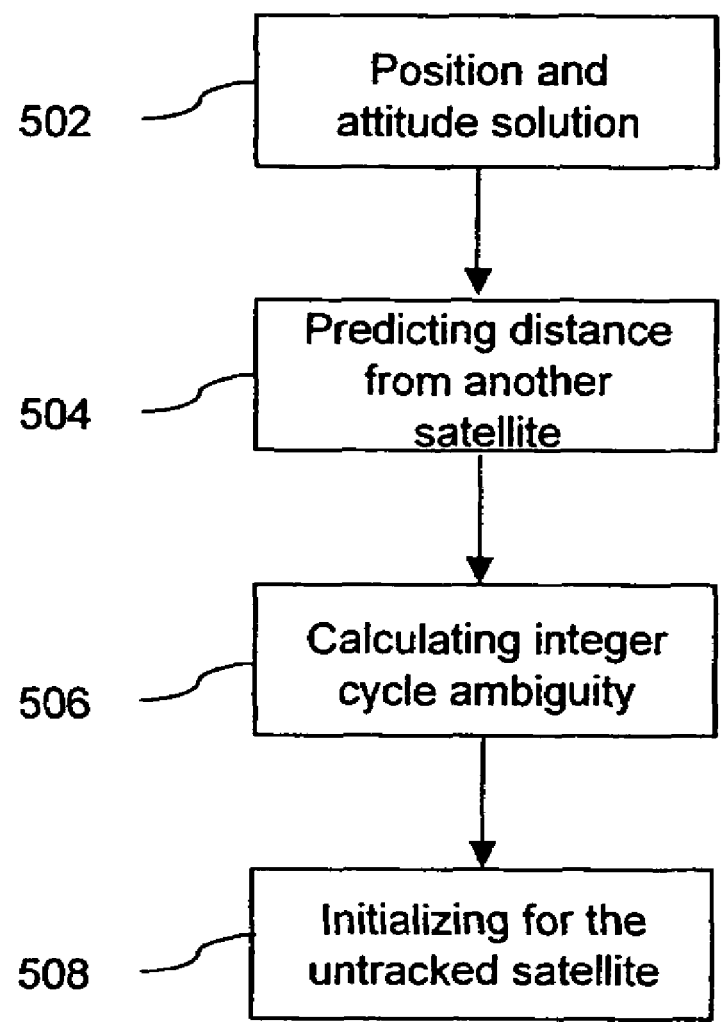
FIG. 5 is a flowchart depicting how information from master processor is used for multiple-antenna integer cycle hand-off.

FIG. 5 is a flowchart depicting how information from master processor is used for multiple-antenna integer cycle handoff in accordance with a preferred embodiment of the current invention. The position solution generated by the master processor is input at step 502. The computed solution is used to predict the distance of the receiver from all potentially visible satellites for all antennas expected at the next sample period at step 504. These distances are used to compute the integer cycle ambiguity for the satellites at step 506. This information is used at step 508 to initialize the receiver to the untracked satellites. In a preferred embodiment, these predicted phases are fed back to the PTM, so that as soon as a new (formerly untracked) satellite becomes visible to the antenna, it will immediately lock on and will have the correct carrier-cycle ambiguity. Thus, multiple antenna cycle integer hand-off is achieved.

Use of Constraints to Solve for Positions

The following discussion shows how constraint information is used for position solution calculations in accordance with a preferred embodiment of the present invention.

When two or more antennas share a common clock, kinematic constraint, or both, the clock or constraint information can be incorporated into the observation matrix to effectively reduce the number of GPS phase measurements required to form the pseudo-inverse of the observation matrix and thereby solve for antennas positions.

Use of a Common Clock as a Constraint

A common clock may be implemented on two or more conventional receivers merely by connecting a low-rate synchronization signal between each receiver or it may be accomplished in a more integrated fashion by connecting different RF front ends to the same oscillator. Either way, a common clock can reduce the required number of measurements by one for every antenna added beyond a first antenna.

For a code phase solution, the common clock changes the relationship between the user states and the differential code phase measurements to the set of coupled equations:

$$\begin{bmatrix} \Delta\rho_1 \\ \Delta\rho_2 \\ \vdots \\ \Delta\rho_{n_a} \end{bmatrix} = \begin{bmatrix} E_1 & 0 & \cdots & 0 \\ 0 & E_2 & & \vdots \\ \vdots & & \ddots & 0 \\ 0 & \cdots & 0 & E_{n_a} \end{bmatrix} \begin{bmatrix} \Delta x_1 \\ \Delta x_2 \\ \vdots \\ \Delta x_{n_a} \\ \tau' \end{bmatrix} \quad \text{Equation 14}$$

For a carrier phase solution, the common clock changes the relationship between the user states and the differential carrier phase measurements to the set of coupled equations:

$$\begin{bmatrix} \Delta\phi_1 \\ \Delta\phi_2 \\ \vdots \\ \Delta\phi_{n_a} \end{bmatrix} = \begin{bmatrix} E_1 & 0 & \cdots & 0 \\ 0 & E_2 & & \vdots \\ \vdots & & \ddots & 0 \\ 0 & \cdots & 0 & E_{n_a} \end{bmatrix} \begin{bmatrix} 1 & \bar{I} \end{bmatrix} \begin{bmatrix} \Delta x_1 \\ \Delta x_2 \\ \vdots \\ \Delta x_{n_a} \\ \tau' \\ \Delta N'_{12} \\ \vdots \\ \Delta N'_{n_a n_s} \end{bmatrix} \quad \text{Equation 15}$$

where $$\tau' \equiv \tau + N_{11} \quad \text{Equation 16}$$

and $$\Delta N'_{ij} \equiv N_{ij} - N_{11} \quad \text{Equation 17}$$

The two definitions of $\tau'$ (from Equation 16) and $\Delta N_{ij}'$ (from Equation 17) have by necessity changed slightly from Equation 8, the decoupled equations. Here, one arbitrary integer $N_{11}$ for satellite j=1 and antenna i=1 is combined with the clock bias and subtracted from the other integer states to maintain an observable system of equations.

Use of Kinematic Constraints

The full set of constraints for almost any arrangement of antennas attached to a vehicle and an implement can be assembled from a set of primitive constraints. These include fixed-offset as well as measured relative or measured absolute constraints. Each constraint relates the user state to a fixed number or vector or, by way of an additional sensor, a measured value or vector. This may be written as:

$$f_n(x_1, \ldots, x_{n_a}) = C_n \quad \text{Equation 18}$$

Where $x_j$ are the positions of the user antennas and $C_n$ may be a fixed or measured value or vector. To incorporate such constraints into the least-squares solution methods described above, the constraint (Equation 18) can usually be linearized about the user states $(x_i, \ldots, x_{n_a})$ by way of partial derivatives to form a row vector $\Delta f_n$ as in Equation 6. This can then be used to extend the observation matrix:

$$\Delta f_n \equiv \frac{\delta f_n(\hat{x}_1, \ldots, \hat{x}_{n_a})}{\delta x} \quad \text{Equation 19}$$

For a code phase solution, the constraints change the relationship between the user states and the code phase measurements to the set of coupled equations:

$$\begin{bmatrix} \Delta\rho_1 \\ \Delta\rho_2 \\ \vdots \\ \Delta\rho_{n_a} \\ C_1 \\ \vdots \\ C_{n_c} \end{bmatrix} = \begin{bmatrix} [E_1 \ 1] & 0 & \cdots & 0 \\ 0 & [E_2 \ 1] & & \vdots \\ \vdots & & \ddots & 0 \\ 0 & \cdots & 0 & [E_{n_a} \ 1] \\ & \Delta f_1 & & \\ & \vdots & & \\ & \Delta f_{n_c} & & \end{bmatrix} \begin{bmatrix} \Delta x_1 \\ \tau_1 \\ \Delta x_2 \\ \tau_2 \\ \vdots \\ \Delta x_{n_a} \\ \tau_{n_a} \end{bmatrix} \quad \text{Equation 20}$$

For a carrier phase solution, the constraints change the relationship between the user states and the differential carrier phase measurements to equation:

$$\begin{bmatrix} \Delta\phi_1 \\ \Delta\phi_2 \\ \vdots \\ \Delta\phi_{n_a} \\ C_1 \\ \vdots \\ C_{n_c} \end{bmatrix} = \begin{bmatrix} [E_1 \ 1 \ \bar{I}] & 0 & \cdots & 0 \\ 0 & [E_2 \ 1 \ \bar{I}] & & \vdots \\ \vdots & & \ddots & 0 \\ 0 & \cdots & 0 & [E_{n_a} \ 1 \ \bar{I}] \\ & \Delta f_1 & & \\ & \vdots & & \\ & \Delta f_{n_c} & & \end{bmatrix} \begin{bmatrix} \Delta x_1 \\ \tau'_1 \\ \Delta N_{12} \\ \vdots \\ \Delta N_{1n_s} \\ \Delta x_2 \\ \tau'_2 \\ \Delta N_{22} \\ \vdots \\ \Delta N_{2n_s} \\ \vdots \\ \Delta x_{n_a} \\ \tau'_{n_a} \\ \Delta N_{n_a 2} \\ \vdots \\ \Delta N_{n_a n_s} \end{bmatrix} \quad \text{Equation 21}$$

Where $n_c$ is the total number of independent constraints.

Use of a Fixed Offset Constraint

A fixed offset between antennas exists when two or more antennas are attached to a rigid body. Incorporating this information into the basic formulation reduces the number of measurements required to solve for the user states. For a fixed offset, the position of antenna $i_1$ with respect to antenna $i_2$ is related by the equation:

$$f(x_{i_1}, x_{i_2}) = |x_{i_1} - x_{i_2}| \quad \text{Equation 22}$$

To incorporate this constraint into the least-squares methods described above, equation 22, can be linearized about the user states $x_{i1}$ and $x_{i2}$ to form a vector of partial derivatives:

$$\Delta f = \left[ \frac{x_{i_1} - x_{i_2}}{|x_{i_1} - x_{i_2}|} - \frac{x_{i_1} - x_{i_2}}{|x_{i_1} - x_{i_2}|} \right] \quad \text{Equation 23}$$

In general, if there are N antennas attached to a rigid body, there will be SUM(N−1) constraint equations to add in the manner of equations 22 and 23. Depending on the situation, these SUM(N−1) constraint equations may or may not all add unique information to the observation matrix. However, including all possible constraints can only help and will not adversely affect the observability of the unknown state.

Use of Rotary and Prismatic Joints as Constraints

A complex mechanical linkage can be represented by a combination of simple rotary and prismatic joints. If the relative angles and displacements of all the component joints in a linkage are measured, then the Cartesian vector between any two antennas on either end of the linkage can be computed directly from the sensed joint angles and displacements. Joint angle and displacement measurements can be made through a number of means, including rotary and linear encoders or potentiometers. The constraint relation is similar to that for fixed offset antennas, $$f(x_{i_1}, x_{i_2}) = |x_{i_1} - x_{i_2}| = C_n(q_1, \ldots, q_{nj}) \quad \text{Equation 24}$$

except that in this case, the value of $C_n$ is computed from the vector of measured joint angles and displacements $(q_1, \ldots q_{nj})$ prior to computing the constrained GPS solution using equation 20 or equation 21.

Use of Absolute Constraints

Absolute constraints can be obtained from sensors that provide a measurement with respect to an inertial reference frame relating two or more antennas. Typical sensors include inertial measurement units, magnetic compasses, and clinometers. In such cases, positions of antennas may be related to the measured variables by a function that can be linearized and included as a constraint in the same manner as Equations 18-21.

Use of Common Clock Along with Kinematic Constraints

When both a common clock and kinematic constraints are employed, the user state-to-phase relationships for code and carrier phase solutions may be consolidated to:

$$\begin{bmatrix} \Delta \rho_1 \\ \Delta \rho_2 \\ \vdots \\ \Delta \rho_{n_a} \\ C_1 \\ \vdots \\ C_{n_c} \end{bmatrix} = \begin{bmatrix} E_1 & 0 & \ldots & 0 \\ 0 & E_2 & & \vdots \\ \vdots & & \ddots & 0 \\ 0 & \ldots & 0 & E_{n_a} \\ & \Delta f_1 & & \\ & \vdots & & \\ & \Delta f_{n_c} & & \end{bmatrix} \begin{bmatrix} 1 \\ \Delta x_1 \\ \Delta x_2 \\ \vdots \\ \Delta x_{n_a} \\ \tau' \end{bmatrix} \quad \text{Equation 25}$$

and $$\begin{bmatrix} \Delta \phi_1 \\ \Delta \phi_2 \\ \vdots \\ \Delta \phi_{n_a} \\ C_1 \\ \vdots \\ C_{n_c} \end{bmatrix} = \begin{bmatrix} E_1 & 0 & \ldots & 0 \\ 0 & E_2 & & \vdots \\ \vdots & & \ddots & 0 \\ 0 & \ldots & 0 & E_{n_a} \\ & \Delta f_1 & & \\ & \vdots & & \\ & \Delta f_{n_a} & & \end{bmatrix} 1 \; T \begin{bmatrix} \Delta x_1 \\ \Delta x_2 \\ \vdots \\ \Delta x_{n_a} \\ \tau' \\ \Delta N'_{12} \\ \vdots \\ \Delta N'_{n_a n_s} \end{bmatrix} \quad \text{Equation 26}$$

In this manner, we see how the present invention simplifies the process of position determination through the use of constraint information.

Applications of the Invention

The current invention can be applied to surveying, construction, agricultural and mining equipment. With the integration of this system, the iterative process of removing earth and surveying to get a desired terrain can be made obsolete. The implement can be tracked along with simultaneous surveying of the terrain that is being worked upon.

Figure 6:
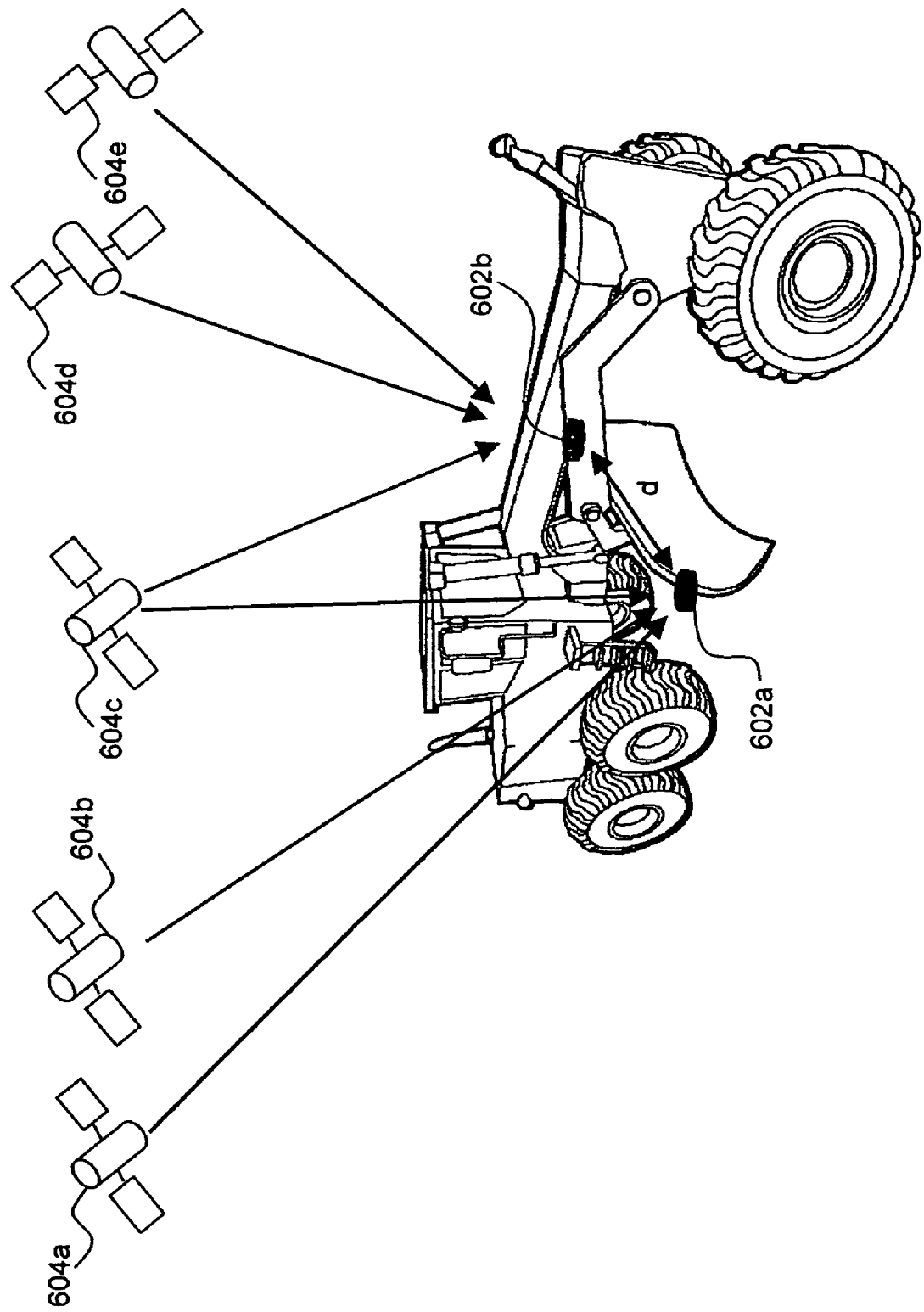
FIG. 6 shows an isometric view of an application of the present invention in a motor grader blade.

FIG. 6 shows an application of the present invention in a vehicle. The invention is being used to determine the position and attitude of a motor grader blade. There are two antennas 602a and 602b attached to the motor grader blade. The distance between the two antennas is 'd'. There are five satellites 601a-d that are visible to at least one of the two antennas. Antenna 602a receives satellites from 601a, 601b and 601c while antenna 602b receives signals from 601c, 601d and 601e. The antennas being compact have been conveniently mounted on the implement. The position of the antennas can be determined using the six satellite signals, a common reference receiver and the distance between the antennas (represented as 'd' in FIG. 6).

Figure 7:
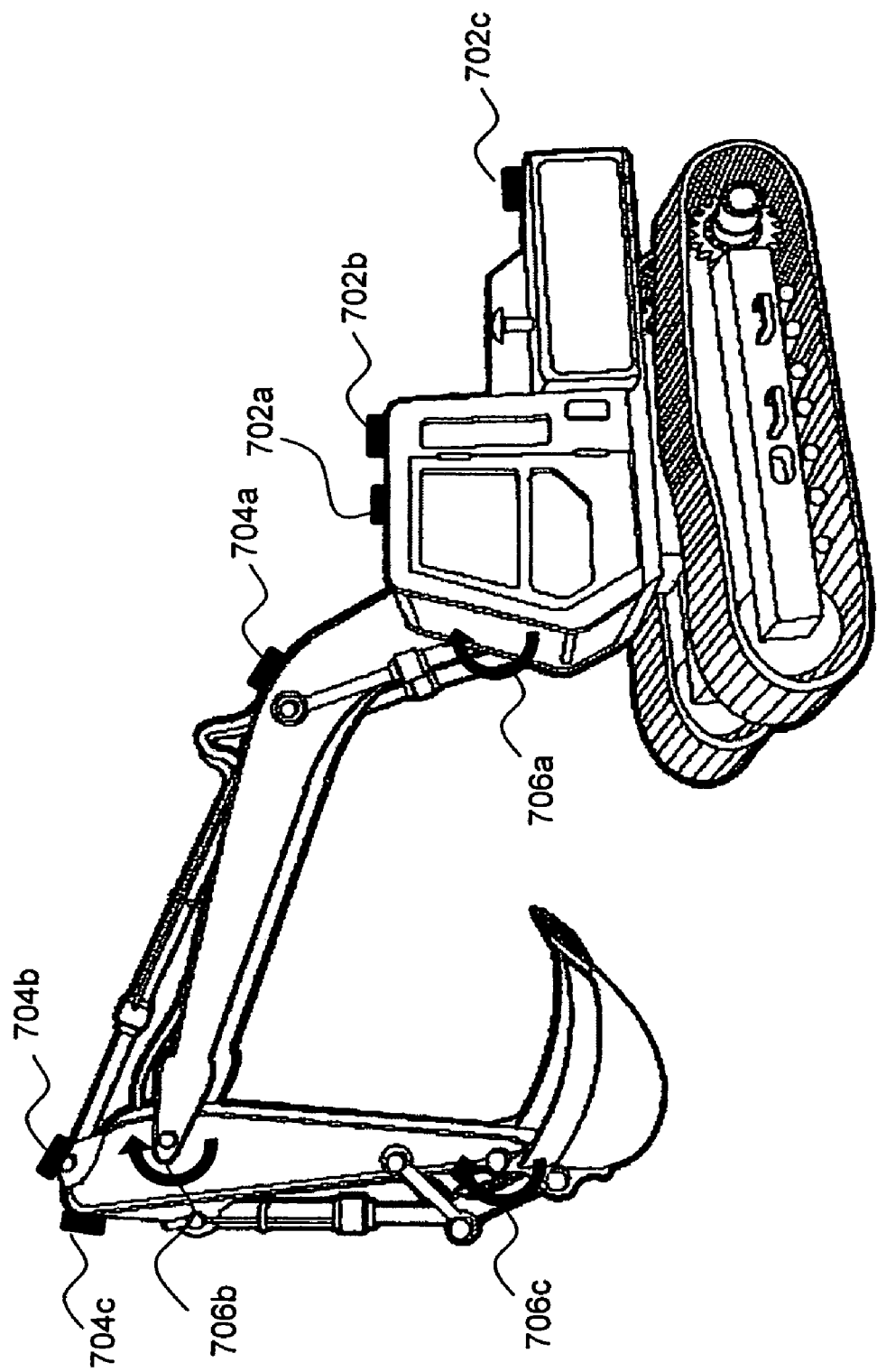
FIG. 7 shows an isometric view of an application of the present invention in conjunction with rotary sensors, in an excavator.

FIG. 7 shows an application of the current invention using rotary sensors for constraint measurements. The vehicle is an excavator and antennas 703a, 703b and 703c have been positioned on the main body and antennas 702a, 702b and 702c are positioned on the arm of the excavator. Constraint information is being generated at the rotary joint sensors 705a, 705b and 705c. This information, along with the signals received from the satellites, is used to determine the attitude and position of the various elements of the excavator. This can help in obviating the need for iterative surveying to get a desired terrain. The terrain data could be used to automatically control the excavator and get the desired terrain.

Although the invention has been described with multiple antennas mounted on the object whose position needs to be determined, the base station in case of DGPS can also employ multiple antennas. Alternatively, both the base station and the object whose position is to be determined, can have multiple antennas for accurately determining the position with signals from fewer than four satellites.

ADVANTAGES OF THE INVENTION

The above invention has several advantages some of which are listed hereinafter.

An advantage of the current invention is the ability to determine the position of multiple antennas on an object using a conventional navigation system, such as GPS, even when fewer than four satellites are visible to some antennas. The use of multiple antennas, along with known independent constraints, allows for solving for the position of fiduciary points on an object with fewer navigation signals.

Use of multiple antennas is very useful when compared to the use of a single antenna. Firstly, multiple antennas are useful when limited satellites are visible to one of the antennas due to signal blockage. In this case, signals received at one antenna are used to compensate for the signal blockage at another antenna. Secondly, multiple antennas can be used to provide a constraint equation. For example, fixed distance between two antennas can be used to get the additional equation to solve for the position of each antenna.

The use of constraints can provide benefit to any carrier-phase method in two ways viz., speeding up initial solution of the integers and feeding-forward an expected solution to an un-tracked satellite-antenna pair to bring the satellite-antenna pair online as soon as line-of-sight visibility is established.

The use of constraints, besides reducing the number of satellite signals required, has some additional benefits. It leads to better position accuracy and integrity, as the constraint information provides greater leverage and Dilution of Precision (DOP) for the GPS signals. DOP is generally improved (lower in value) when the lines-of-sight to the satellites are more spatially distributed, which is likely to occur when a vehicle is instrumented with several antennas, each possibly pointing to different regions of the sky. It can also provide quicker analysis of the available data by simplifying the computationally heavy integer ambiguity calculations.

Yet another advantage of the current invention is the mounting of antennas in a low profile manner. This is advantageous, for example, on construction equipment where it is desired not to have tall, cumbersome masts to elevate antennas. Large antenna mounts are required for continuous tracking. This is because large antenna mounts provide visibility to four satellites. The use of large antenna mounts has led to limited application of GPS based navigation system in earth-moving and agricultural equipment, where mobility of the implement to which the antenna is attached is limited because of the large size of the antenna mounts. This invention provides position information with fewer than four satellites. This allows for the use of compact antenna mounts. Therefore, such systems can be integrated to track the position, and possibly attitude, of implements attached to such vehicles. The compact antenna mounts facilitate end point installation of antennas. This increases the precision of implements and it helps in automatic control of such equipment.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method of obtaining an initial position solution in a satellite navigation system for an object using a plurality of antennas, the antennas connected to at least one receiver, the antennas having a common reference clock, the method comprising:
   a. providing the common reference clock for each antenna;
   b. receiving satellite signals at each antenna;
   c. the receiver determining the initial position solution for the antennas using an external constraint in addition to the common reference clock and the satellite signals received at the antennas, wherein the external constraint is independent of received satellite signals and incorporated into an observation matrix, the initial position solution being solved from the observation matrix, and the external constraint corresponding to a spatial relationship between the antennas, the antennas being connected by a mechanical linkage; and
   d. the initial position solution being obtained using signals from fewer than four satellites at some or all antennas;
   wherein determining the initial position further comprises:
      calculating an integer cycle ambiguity resolution for input signals to compute position at two or more antennas;
      predicting signal information from all potentially visible satellites using the calculated antenna positions; and
      initializing the processor of the receiver for all the potentially visible satellites using the predicted signal information;
   the position solution being obtained using signals from fewer than four satellites at some or all antennas.

2. The method of claim 1 further comprising:
   checking for a consistency of phase between the plurality of antennas; and
   correcting any inconsistency using the external constraint.

3. The method of claim 1 further comprising initializing the plurality of antennas using an already initialized antenna.

4. The method of claim 1 further comprising obtaining correction factors for each of the received satellite signals from a reference station.

5. The method of claim 1 wherein the external constraint is a previously surveyed position of at least two antennas relative to each other.

6. The method of claim 1 wherein the external constraint is an inertial measurement of attitude of the object.

7. The method of claim 1 wherein the external constraint is a measurement of relative motion of one antenna with respect to another.

8. A method of obtaining a position solution in a satellite navigation system for an object using a plurality of antennas, the antennas connected to at least one receiver, the antennas having a common reference clock, the method comprising:
   a. providing the common reference clock for each antenna;
   b. receiving satellite signals at each antenna;
   c. the receiver determining the position solution for the antennas using an external constraint in addition to the common reference clock and the satellite signals received at the antennas, wherein the external constraint is independent of received satellite signals and wherein the antennas are connected with different components of a mechanical linkage, one of the components connected with one of the antennas linked with and operable to move relative to another one of the components, connected with another one of the antennas, of the mechanical linkage, wherein the external constraint is obtained by measuring a linkage position or angle of one component of the mechanical linkage relative to the other component of the mechanical linkage such that a vector between the antennas is determined, the external constraint being a function of the vector;
   d. the position solution being obtained using signals from fewer than four satellites at some or all antennas.

* * * * *